2,981,722
PROCESS FOR THE PRODUCTION OF VINYL-CHLORIDE POLYMERS BY DISPERSION PROCESSES IN AQUEOUS MEDIA

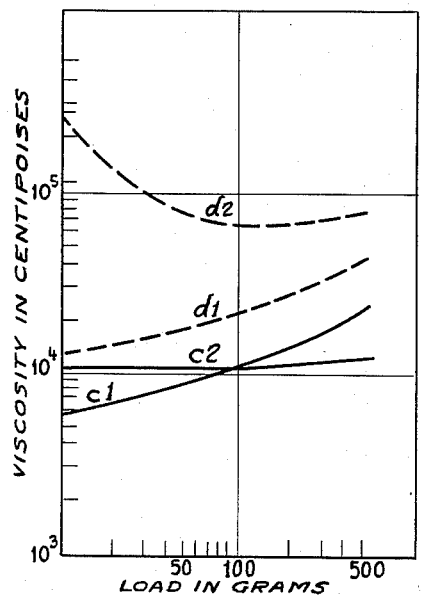
Fig. I.
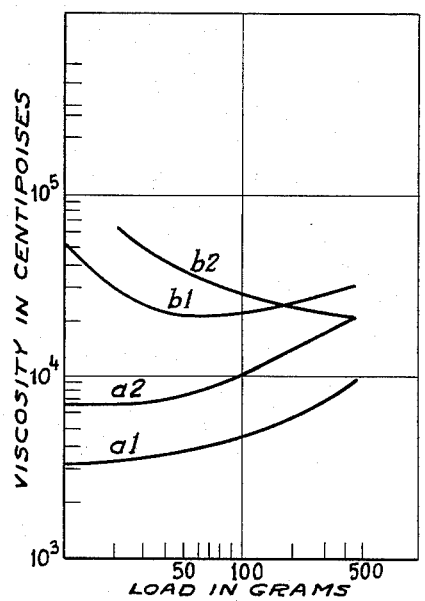
Fig. II.
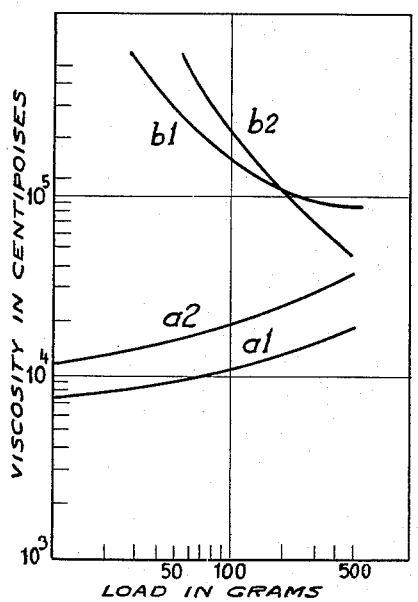
Fig. III.
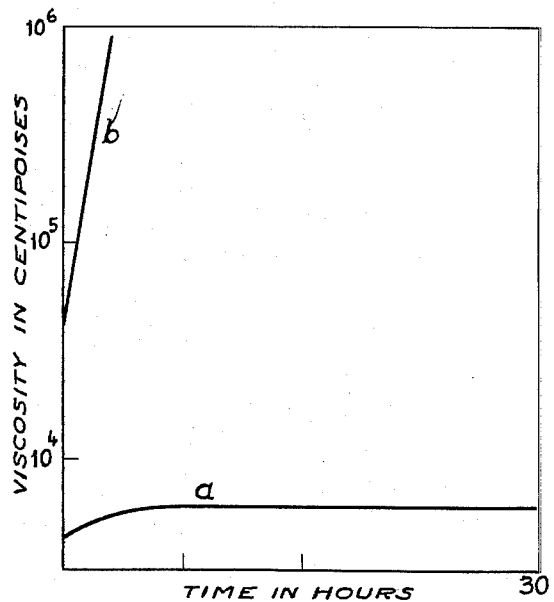
Fig. IV.
INVENTORS.
EDUARD ENK.
HERBERT REINECKE.
BY EDUARD KURZ.
ATTORNEYS.

Eduard Enk and Herbert Reinecke, Burghausen, Upper Bavaria, and Eduard Kurz, Stockach, near Marktl (Inn), Germany, assignors to Wacker-Chemie G.m.b.H., Munich, Germany, a firm of Germany Filed Oct. 7, 1957, Ser. No. 688,764

Claims priority, application Germany Oct. 9, 1956

5 Claims. (Cl. 260—87.1)

An object of this invention is the polymerization of vinylchloride as well as mixtures of vinylchloride with copolymerizable compounds in aqueous media utilizing dispersion polymerization techniques to form polymerizates which are particularly suitable for use in forming plastisols.

The polymerization of vinylchloride in the presence of water-soluble catalysts and emulsifiers utilizing emulsion polymerizaiton technique is known. In accordance with these processes, however, aqueous dispersions of polymerizates having a particle size of $0.1\mu$ are usually obtained. These dispersions are not amenable to filtration or to centrifugal separation without prior coagulation, and usually, their further processing for the most part relies upon spray drying which, of course, allows the polymerizing agents to remain in the product.

These polymerizates are not well suited for use in forming plastisols because of their excessively small particle size. A subsequent increase in particle size during drying is possible and by this expedient an improvement in plastisol-forming properties may be obtained. The necessary ageing and milling required for the treatment of such pasty materials interferes with and seriously reduces the capacity of the equipment in which the processing is being carried out. In addition, the slow rate of production of such batches interferes with their application, such as, for example, the coating of fabrics with these plastisols.

Different processes have been proposed for increasing the particle size of latices such as, for example, initiating the polymerization without an emulsifying agent or employing a seeding or starting latex. Such polymerizates are better suited for use in plastisols yet the greater part of the water in aqueous dispersions of these materials cannot be removed by filtration or centrifuging without coagulation.

Furthermore, it has long been known that a starting mixture containing the monomer, water, catalyst, emulsifier and a polymerization initiator may be homogenized to form a stable aqueous dispersion by mechanical action. In accordance with a known process involving the mechanical homogenization of such a starting mixture, followed by polymerization, heat-treatment and coagulation, a polyvinylchloride suitable for use in plastisols is formed.

It has now been found that if the mechanical homogenizaion prior to the emulsion or suspension polymerization of vinylchloride, or mixtures of vinylchloride with a monomer copolymerizable therewith and containing water, a dispersing agent and a catalyst soluble in the monomer, especially those containing a substantial amount of vinylchloride, at least 60% by weight on the weight of the aqueous dispersion, is carried out to less than complete homogenization, the vinylchloride polymer or copolymer formed on subsequent polymerization is readily separated from the resulting dispersion by simple filtration or centrifugation and without subsequent heat treatment and without coagulation.

The mechanical homogenization of the starting mixtures may be carried out by the application thereto of a shearing force. A large number of suitable forms of apparatus are suitable for this purpose such as, for example, colloid mills, high speed pumps, vibratory stirrers, ultrasonic devices as well as high speed stirrers which cause the reaction mixture to impinge on flat baffles by the action of centrifugal force. If one polymerizes, in the usual manner, mixtures which are completely homogenized, one obtains aqueous dispersions of polymers which, as mentioned above, are not amenable to separation by filtration or centrifugation. If, however, the mechanical homogenization is not carried out to the point where complete homogenization is achieved, the dispersions obtained on subsequent polymerization permit the greater part of the water and polymerization aids to be removed merely by filtration or centrifugation.

The incomplete homogenziation is carried out in such a fashion that the mechanical force is permitted to act on the starting mixture, prior to polymerization, for only a short time. The mechanical action is so limited that if the monomeric aqueous dispersion so formed is permitted to stand, a small amount of the monomer will separate at the surface. This monomeric portion can be removed and can be utilized over again in the preparation of further batches. If the vinylchloride which separates on permitting the homogenizate to stand is not removed prior to polymerization, it floats on the dispersion as a solid, polymerized coherent layer, which after the grinding of the polyvinylchloride dispersion can then be mixed in again.

The incomplete homogenization is assisted by the use of a limited amount of an emulsifying agent, which is just sufficient, however, to prevent any substantial separation of monomer from the water. As the dispersing agent, one or more of any of the oridinary well-known dispersing agents may be employed. Suitable agents are, for example, the alkali metal salts of fatty acids, such as lauric or palmitic acid, the sulfuric acid esters of higher molecular weight fatty alcohols, sulfonated paraffinic hydrocarbons, salts of dialkyl sulfosuccinic acids, salts of alkyl naphthalene sulfonic acids, lauryl pyridinium hydrochloride, the partial fatty acid esters of polyhydroxy alcohols such as sorbitol monoplamitate, etc., and the partial fatty acid esters of polyhydroxy alcohols particularly when employed in combination with salts of fatty acids, such as, for example, ammonium laurate. The foregiong are all especially useful for carrying out the processes of this invention.

It also appears, furthermore, that the use of salts of fatty acids containing an epoxy group, such as ammonium epoxystearate, facilitate the homogenization. While vinylchloride is difficultly homogenized in water in the presence of ammonium stearate or ammonium palmitate, in the presence of ammonium epoxystearate, homogenization takes place readily. Advantageously, a partial fatty acid ester of a polyhydroxyalcohol such a sorbitol monopalmitate is used in conjunction therewith. Because of the epoxy groups, the polymerizates obtained exhibit an increased stability toward heat.

In place of the salts of fatty acids containing an epoxy group, there may also be employed the salts of the reaction products of peracids, such as peracetic acid, upon unsaturated fatty acids, or upon oleic or linoleic acid, or on dihydroxystearic acid and hydroxyacetoxy stearic acid. Also the reaction products of peracids upon unsaturated hydroxy fatty acids such as ricinoleic acid may be employed. These modified fatty acids can also be introduced in admixture with fatty acids such as stearic acid or palmitic acids in the form of their salts.

The catalysts which are particularly useful are those catalysts which are soluble in the monomers, such as benzoyl peroxide or lauryl peroxide. Also, mixtures of peroxides such as lauryl peroxide with 2,4-dichlorobenzoyl peroxide can be employed. Lauryl peroxide is preferably employed.

The polymerization of the incompletely homogenized monomer emulsion obtained can be carried out in accordance with the usual procedures. The polymerization may, for example, be carried out without stirring. In this way, polymer dispersions with a solids content of as high as 50% may be readily formed. In order that the heat of polymerization may be dissipated without any difficulty, the use of layers of limited depth in the polymerization apparatus is advisable, which layers may have a dimension of 5 centimeters to 150 centimeters but preferably have a dimension of 60 centimeters to 100 centimeters.

Fig. I of the drawing shows the viscosity in centipoises of plastisols obtained from a mixture of two parts of polyvinylchloride and one part of ethylhexyl phthalate relative to the unit stress or load in grams as measured at 25° C. with the Höppler falling ball viscometer using the number 3 ball which is provided. The curves identified as $c1$ and $c2$ indicate the viscosity as determined two hours after mixing, the curves $d1$ and $d2$ indicate the viscosity of the plastisols measured at 25° C. after having been aged by heating at 40° C. for 24 hours, the curves $c1$ and $d1$ being the viscosity curves of plastisols formed without any stirring while curves $c2$ and $d2$ are those where stirring is employed.

Because of the incomplete homogenization and the small amounts of emulsifier employed, relatively large particles are formed in the latices obtained in accordance with this invention. These polymer dispersions tend to settle on standing and, particularly those of high solids content, are not stable on stirring. This limited stability toward stirring can be improved, however, by converting the finely dispersed form into a more coarsely dispersed form. This may be done if a further quantity of vinyl chloride is introduced, preferably toward the end of the polymerization reaction. In this way polymers are obtained in which the particles vary in size from about 10 to $60\mu$ (microns).

The polymer dispersions obtained in accordance with this process, wherein incomplete homogenization is then followed by polymerization, can be filtered or separated by centrifugation, using suction filters or similar devices and with surprising speed on pressure filters, especially when combined with a vacuum applied to the suction side. The dispersions require a proportionately greater time for filtration when a vacuum alone is applied. It is quite unexpected that the use of pressure alone or the simultaneous application of pressure and suction permits the more rapid separation of a greater proportion of the water in the dispersion than had been thought possible. The time required to effect filtration of a given quantity of dispersion with a suction filter of a given size where the suction side alone is maintained under a vacuum of 20 mm. is eight times that required when a pressure of 1 atmosphere is maintained on the filter in conjunction with the same vacuum of 20 mm. on the suction side. The operation can be carried out continuously by the use of apparatus where continuous pressure and vacuum can be applied.

The filter cake obtained in accordance with the process of this invention can be further purified by washing. By washing the material while on the filter the residue of polymerization catalyst can be removed, or rendered harmless by a chemical conversion. The polymerizates prepared in this way are rendered particularly free of emulsifying agents. By washing with water containing an alkaline earth metal salt, the residues of surface-active alkali metal and ammonium salts are converted into alkaline earth metal salts. The product obtained no longer contains any ionic emulsifying agent. It is also possible to convert any ammonium laurate present into the corresponding barium or cadmium laurate which are known for their heat-stabilizing action on polyvinylchloride. In this way by the formation, for example, of heat- or light-stabilizing agents on the filtering apparatus employed, it is possible to produce desired improvements in the final product.

The polymerizates obtained exhibit a very low moisture content which may be as low as 20%. The polymerizates can then be dried in accordance with any of the known methods such as, for example, tray drying, kiln drying or counter-current drying. Predispersion in water followed by spray drying is also feasible. The dispersions obtained can also be dried directly without removing the polymerization aids by passing through an atomizer.

The plastisols obtained possess low viscosity and, for the processing of said plastisols, exhibit desirable rheological properties. The plastisols exhibit only a very small increase in viscosity on storage.

Fig. II of the drawing shows in curves $a1$ and $a2$ the functional relationship of the plastisol viscosity in centipoises to the unit stress or load in grams of a plastisol in which the ratio of components is two parts of polyvinylchloride to one part of ethylhexylphthalate. The viscosity is measured at 25° C. with a Höppler falling ball viscosimeter utilizing the number 3 ball. For comparison, in curves $b1$ and $b2$ there is shown the viscosity relationship of an analogous polyvinylchloride plastisol composition prepared in accordance with the process of this invention and that of a similar, polyvinylchloride plastisol of the same composition but prepared in the ordinary way.

The change in viscosity of these analogous products on storage or ageing is shown in Fig. III. The viscosity is likewise measured at 25° C. in the Höppler viscosimeter with the number 3 ball after the plastisols are aged for 24 hours at 40° C. This ageing test is the equivalent of storage at room temperature, say 15° C. to 25° C. for one year.

Fig. IV indicates the change in the viscosity of certain pastes on storage at a room temperature of 20° C. to 25° C. A comparison was made, using the same test procedure, between the plastisol viscosity of commercially available plastisol polymerizates of vinylchloride and the corresponding plastisol polymerizates prepared in accordance with this invention. As above, two parts of the polymerizate and one part of ethylhexylphthalate were employed. The viscosities were measured at 25° C. using the Höppler viscosimeter and a number 3 ball. Curve $a$ indicates the rather slight change in viscosity with ageing of the compositions of this invention while curve $b$ shows the very rapid increase observed in the case of compositions prepared in the usual way.

*Example 1*

To a 400 liter reaction vessel provided with a V2A steel inner surface and a bladed agitator, and which is freed of oxygen by evacuation or by flushing with nitrogen, is added a mixture of 150 kg. of deionized water, 150 kg. of vinylchloride, 0.75 kg. of sodium lauryl sulfate and 0.15 kg. of lauryl peroxide. The mixture is circulated through the vessel for a period of 45 minutes by means of a centrifugal pump rotating at 3000 r.p.m. and which delivers 10 cubic meters per hour at a pressure of three atmospheres. Simultaneously, the bladed agitator in the reaction vessel is rotated at a speed of about 60 r.p.m. The agitator and pump are then halted. After 30 minutes the vinylchloride separating at the surface of the mixture, about 10 kg., is removed. The reaction vessel is then heated to 50° C. without stirring and after 25 hours the pressure formed is released. An aqueous polyvinylchloride dispersion is obtained containing 45% by weight of solids and having a density of 1.150. The dispersion is then filtered on a suction filter by maintaining a vacuum of 50 mm. of mercury on the suction side. To form a filter cake 5 cm. in thickness requires a filtration time of 8 hours. The filter cake, containing 21% moisture, is placed in small containers and dried in a stream of warm air heated to 40° C., the dried material obtained then passed through a screen of a mesh having 0.5 mm. orifices. A polyvinylchloride having a K-value of 70 is obtained which is readily dispersed in ethylhexylphthalate. The pasty mixture formed when 4 parts of the polyvinylchloride are mixed with 2 parts by weight of ethylhexylphthalate has a viscosity of 10,000 centipoises measured at 25° C. with the Höppler viscosimeter using a 70 gram number 3 ball. After ageing for 24 hours at 40° C., the viscosity increases to 17,000 centipoises.

When this starting mixture is circulated by the pump for 90 minutes instead of for 45 minutes, a monomer emulsion is obtained in which a layer of vinylchloride does not separate at the surface and, after polymerization, this emulsion yields a polyvinylchloride dispersion which cannot be filtered on a suction filter in any reasonable period. Even with the application of a vacuum of 50 mm. of mercury applied to the suction side for 100 hours, complete filtration is not effected. When the polyvinylchloride obtained after drying is dispersed in ethylhexylphthalate in a ratio of 4 parts of polyvinylchloride to 2 parts of ethylhexylphthalate, the mixture obtained has a viscosity of 15,000 centipoises and after ageing at 40° C. for 24 hours, the viscosity rises to 100,000 centipoises.

*Example 2*

A mixture of 150 kg. of deionized water, 200 kg. of vinylchloride, 1.5 kg. of sorbitol monopalmitate, 0.4 kg. of ammonium laurate and 0.2 kg. of lauryl peroxide are homogenized as described in Example 1. After the homogenized mixture is allowed to stand for 15 minutes 80 kg. of vinylchloride separate from the emulsion. After the separated layer of vinylchloride has been removed, the emulsion is polymerized as described in Example 1 and the resulting polyvinylchloride dispersion, containing 40% solids, is separated from the greater part of its water content on either a suction or a pressure filter. By washing with a 1% calcium chloride solution, the residue of ammonium laurate is converted to calcium laurate. The filter cake formed contains 19% moisture.

After adding 20%, on the weight of the dispersion, of vinylchloride, 50 kg. of the 40% solids polyvinylchloride dispersion obtained is converted to a suspension of polyvinylchloride of 10 to 40μ particle size by stirring at 35° C. in a 100 liter autoclave in which the stirrer is driven at a speed of 120 r.p.m. After the polyvinylchloride is discharged from the autoclave, it is separated from the greater part of the water by filtration, washed with 1% aqueous ammonia and then dried at 60° C. in a drum dryer.

*Example 3*

By means of proportioning pumps formed of V4A steel, 500 kg. per hour of vinylchloride containing 0.1% lauryl peroxide and 500 kg. per hour of deionized water in which 2 kg. of sodium lauryl sulfate are dissolved are fed to a multistage rotary pump. The latter pumps the mixture under 15 atmospheres' pressure through a nickel jet or head which is provided with 500 orifices each of 0.3 mm. diameter and then into a storage vessel of 5 cubic meters' capacity. After 4 cubic meters have gone into the receiver the discharge from the jet is switched to a second receiver. After the mixture in the first vessel has been allowed to stand for 15 minutes, the layer of vinylchloride which separates at the surface is removed. This amounts to 100 kg. The homogenized monomer is then pumped to a vessel formed of V4A steel 40 cm. in diameter and 10 meters in height. By means of hot water the vessel is heated to 45° C. and, after 30 hours the vinylchloride portion is removed through a discharge valve. The polyvinylchloride dispersion obtained contains 43% solids. The dispersion is passed to a continuous pressure filter having a filtering surface of one square meter. The filter handles 500 liters per hour of the dispersion yielding a filtered layer 5 mm. in thickness. The filter is further equipped with a washing means which forces 200 liters per hour at 1.5 atmospheres' pressure through the filter cake. After the washing process, all of the liquid which can be separated from the filter cake is removed by compressed air at 1.5 atmospheres' pressure. The filter cake leaving the filter contains 18% moisture. After drying in a current of warm air, a polyvinylchloride having a K-value of 76 is obtained which can be readily dispersed in ethylhexylphthalate. A paste formed of 4 parts of this polyvinylchloride and 2 parts of ethylhexylphthalate has a viscosity of 8,000 centipoises measured at 25° C. with a Höppler viscosimeter utilizing a 70 gram number 3 ball. After a 24 hour ageing at 40° C. the viscosity increases to 14,000 centipoises.

If the starting mixture fed by the proportioning pumps is forced through the jet twice under the pressure of the multistage pump, no separation of vinylchloride from the resulting monomer homogenizate occurs. The polyvinylchloride dispersion obtained after polymerization cannot be handled on a continuous suction filter since it either clogs the filter cloth used or, if a coarser cloth is used, it passes through the pores.

*Example 4*

A process similar to that described in Example 3 is carried out but in place of using 500 kg. of vinylchloride a mixture of 450 kg. of vinylchloride and 50 kg. of vinylacetate is employed. The polymerizate obtained after drying forms a paste, when mixed in a ratio of 4 parts of the polymerizate with 2 parts of ethylhexylphthalate, having a viscosity of 23,000 centipoises, measured as described. After eight days at 20° C., the viscosity increases to 65,000 centipoises.

*Example 5*

A mixture of 900 grams of vinylchloride, 900 grams of water, 4.5 grams of ammonium epoxystearate, 4.5 grams of sorbitol monopalmitate and 0.9 gram lauryl peroxide are introduced into a 2 liter vessel equipped with a homogenizer and mixed violently for one minute. The homogenizer is disconnected and, after the mixture has been allowed to stand for 15 minutes, the small amount of vinylchloride which separates at the surface is removed. The monomer dispersion is then heated to 50° C. for 30 hours without stirring in a tubular vessel formed of V2A steel. The polymer dispersion formed contains 48% solids and the latter is dried by spraying into a stream of warm air. The polyvinylchloride obtained is easily formed into a paste with plasticizers. A paste formed of 5 parts of polyvinylchloride and 2 parts of ethylhexylphthalate has a viscosity of 10,000 centipoises measured as described. After a 24 hour ageing at 40° C. the viscosity increases to 30,000 centipoises.

By merely increasing the time of homogenization of the starting mixture by an additional two minutes prior to the polymerization, but without any other change, a polyvinylchloride is obtained which, when formed into a similar paste, has an initial viscosity of 10,000 centipoises which, however, after ageing increases to 150,000 centipoises.

*Example 6*

A mixture of 200 kg. of deionized water, 200 kg. of vinylchloride, 1.2 kg. of the ammonium salt of a mixture of acids obtained by the action of hydrogen peroxide on oleic acid in the presence of acetic acid and 0.3 kg. of lauryl peroxide are homogenized as described in Example 3 except that in this example the diameter of the orifices of the jet employed is 0.4 mm. The mixture, after being forced through the jet by the multistage pump, is then passed directly to a tubular autoclave having a diameter of 80 cm. and formed of V2A steel. Polymerization is then carried out by heating to 50° C. without stirring. After 27 hours at this temperature, polymerization is completed and a polyvinylchloride dispersion containing 48% solids is obtained. A small amount of a solid polymerizate floats on the surface of the dispersion. This disappears after the milling of the polyvinylchloride dispersion. The further processing of the dispersion consists of filtering with suction, washing, and drying in a drum dryer, care being taken to avoid heating above about 40° C. The polyvinylchloride obtained when formed into a paste with dioctylphthalate in a ratio of 2 to 1, yields plastic mass having a viscosity of 4,000 centipoises, measured as described with the Höppler falling ball viscosimeter.

We claim:

1. In a process for the production of dispersions of polyvinyl chloride and copolymers of vinyl chloride with vinyl acetate, the steps which comprise forming an emulsifiable aqueous reaction mixture containing a compound selected from the group consisting of vinyl chloride and of mixtures thereof with vinyl acetate, a monomer soluble catalyst and an emulsifying agent, agitating the mixture while below polymerization temperature to form an emulsion in which less than all of the emulsifiable monomer present is emulsified, allowing the emulsion to stand and the unemulsified monomer to separate as a surface layer, removing the separated unemulsified monomer layer, heating the monomer emulsion without agitation to a polymerization temperature of at least 45° C. to cause said emulsified monomer to undergo polymerization and form a dispersion of polymer particles, and separating the polymer particles from the aqueous phase by filtration.

2. Process in accordance with claim 1 wherein the emulsifying agent employed is the mixture of a partial fatty acid ester of a polyhydroxy alcohol with an ionic emulsifying agent.

3. Process in accordance with claim 2 wherein the ionic emulsifying agent is a salt of fatty acid containing an epoxy structure.

4. Process in accordance with claim 2 wherein the ionic emulsifying agent is the salt of the reaction product of a per acid with an unsaturated fatty acid.

5. Process in accordance with claim 1 wherein the filtered polymer is subjected to an aqueous wash under pressure.

References Cited in the file of this patent

UNITED STATES PATENTS

| | | |
|---|---|---|
| 2,426,422 | Plambeck | Feb. 22, 1949 |
| 2,496,384 | De Nie | Feb. 7, 1950 |
| 2,520,959 | Powers | Sept. 5, 1950 |
| 2,674,593 | Condo et al. | Apr. 6, 1954 |
| 2,705,226 | Bond | Mar. 29, 1955 |
| 2,771,457 | Barnes et al. | Nov. 20, 1956 |

FOREIGN PATENTS

| | | |
|---|---|---|
| 638,640 | Great Britain | June 14, 1950 |